CARL A. NORGREN
INVENTOR.

BY
ATTORNEY

Patented June 10, 1952

2,599,577

UNITED STATES PATENT OFFICE 2,599,577

BALANCED FLUID PRESSURE REGULATING VALVE

Carl A. Norgren, Denver, Colo., assignor to C. A. Norgren Co., Denver, Colo., a corporation of Colorado Application October 8, 1947, Serial No. 778,707

5 Claims. (Cl. 50—20)

My invention relates to automatically actuated valves for regulating the flow of fluid under pressure and particularly to such valve for operation over a wide range of pressure of the fluid supply.

Automatic fluid pressure regulators or reducing valves commonly comprise a valve actuated by an expansible chamber device or diaphragm subject to the outlet pressure and a regulating or calibrating spring for determining the pressure to be maintained. The regulating spring normally urges the valve away from its seat in opposition to the pressure of the fluid on diaphragm on the outlet side of the valve; a state of equilibrium is reached at the desired outlet pressure. When the valve is closed, it is subject to inlet pressure on one side and to outlet pressure on the other and the resultant difference in pressure tends to hold the valve closed. Should the inlet pressure increase substantially, the valve may be rendered inoperative, and for this reason, various arrangements have been provided to overcome this disadvantage.

For example, the size or effective area of the regulating diaphragm relative to the diameter of the valve may be so proportioned as to minimize the effect of changes in the fluid supply pressure. These arrangements often result in a large and bulky unit and are not satisfactory for all purposes. Accordingly, it is an object of my invention to provide a fluid pressure regulating valve including an improved arrangement for minimizing the effects of changes in inlet pressure.

It is another object of my invention to provide an improved pressure regulating valve including an arrangement for balancing the valve to prevent variations in operation due to changes in the pressure of the fluid supply.

Other objects reside in novel details of construction and novel combinations and arrangements of parts, all of which will be described in the course of the following description.

For a better understanding of my invention, reference may be had to the accompanying drawing in which.

Figures 1, 2, 3:
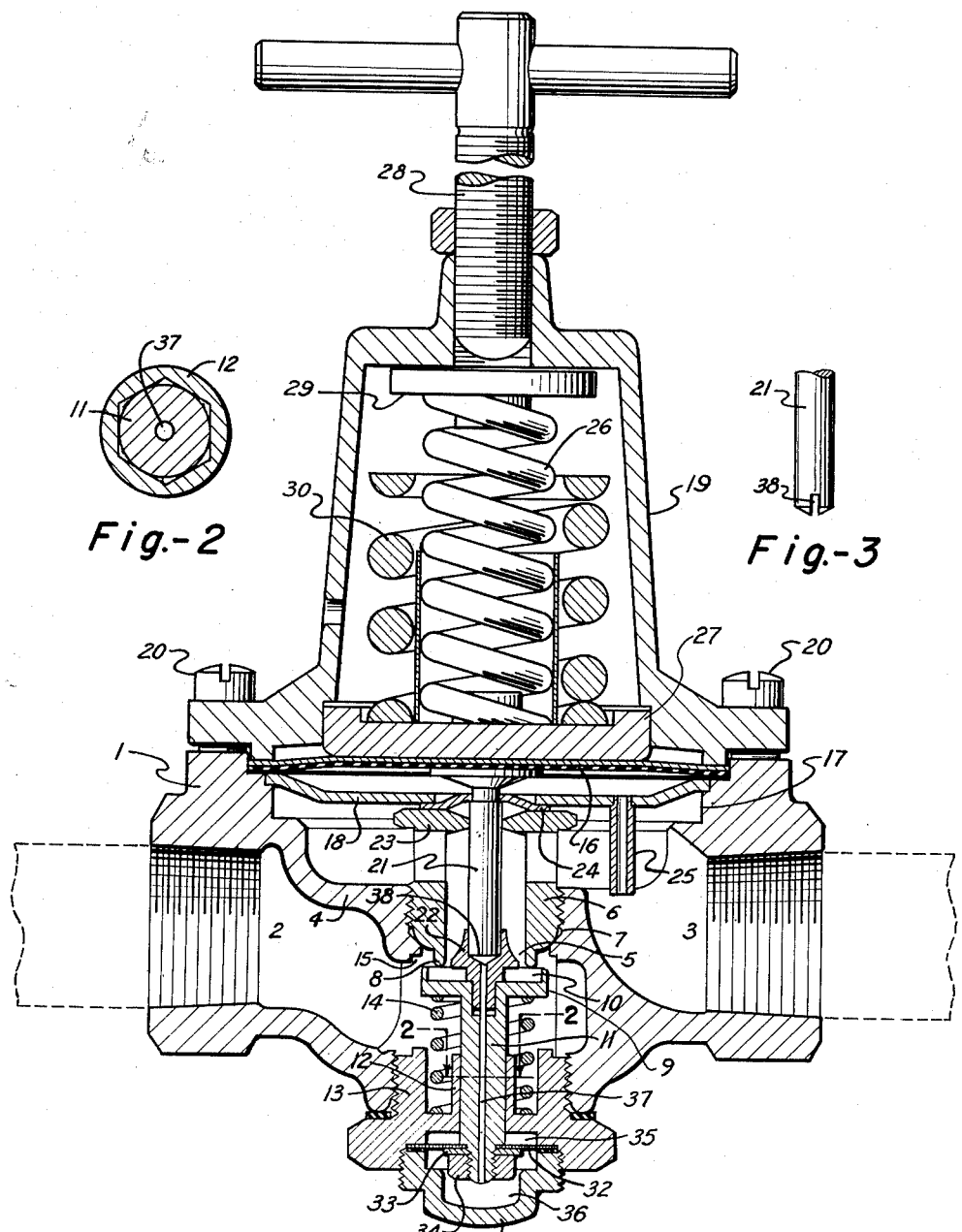
Fig. 1 is a sectional elevation view of a fluid pressure regulating valve embodying my invention.
Fig. 2 is a sectional view on the line 2—2 of Fig. 1.
Fig. 3 is an elevation view of a portion of the valve actuating rod of Fig. 1 taken at right angles to the view of Fig. 1.

The fluid pressure regulator as shown in Fig. 1 comprises a valve body 1 having an inlet 2 and an outlet 3 separated by a wall or partition 4 in which is arranged a valve port 5. The port 5 is formed in a threaded member 6 which is screwed into an opening 7 in the partition 4 and which is formed to provide a valve seat 8 on the inlet side of the port. A valve 9 having a seat engaging face or washer 10 is mounted on the inlet side of the port for sliding movement toward and away from the seat 8. The valve includes a cylindrical stem 11 which is slidably mounted in a guide 12 formed in a plug 13 threaded into an opening in the valve body. The valve is biased to its closed position by a compression spring 14 mounted between the valve and the plug 13. Particles of foreign matter which may enter the inlet 2 are prevented from reaching the valve by a screen 15 extending between the wall 4 and the plug 13 and entirely around the valve and spring.

In order to actuate the valve 9 in accordance with the outlet fluid pressure and to maintain a predetermined pressure in the outlet, an expansible chamber device or diaphragm 16 is provided on the outlet side of the valve. The diaphragm is mounted in a relatively large circular opening 17 in the valve body, and it, together with a spaced baffle plate 18, is sealed to the outer wall of the valve by a bonnet or housing 19 having a circular base secured to the valve body by screws 20. The diaphragm 16 is provided with a central push rod 21 which is seated in a cuplike fitting 22 in the top of the valve stem 11 and which slidably engages a guide collar 23 found on the threaded valve seat member 6. In order to prevent communication about the rod 21 between the outlet and the space between the diaphragm and the baffle 18, a flexible packing member 24 is secured about the rod and is clamped about its periphery between the plate 18 and the collar 23. Outlet pressure is impressed on the lower side of the diaphragm 16 through a short tube 25 secured in the plate 18 and extending toward the outlet in the direction of the outward flow of the fluid.

The operating pressure to be maintained by the valve is determined by the effective force of a spring 26 which exerts pressure between the upper spring rest of bonnet 19 and the diaphragm 16. In order to insure uniform distribution of the force of the spring 26 over the major portion of the area of the diaphragm, the lower end of the spring is seated on a rest or disk 27 which is mounted for sliding movement in the lower end of the bonnet 19 and which engages the diaphragm over its major central area. The effective force of the spring 26, which tends to move the valve 9 away from seat 8, may be changed by an adjusting screw 28 threaded in the top of the bonnet and engaging the upper spring rest 29 engaging the upper end of the spring. If desired, a second shorter spring 30 of suitable strength may be mounted around the spring 26 so that a wide range of calibration of the valve setting may be secured. The second spring is engaged by the upper spring rest 29 only after the first spring has been compressed a substantial distance.

It will be seen that the force of the spring 26 is opposed by the pressure on the underside of the diaphragm and the force of the valve spring 14. It follows that the valve will open to admit fluid to the outlet until the pressure on the outlet is sufficient to balance the force of the spring. When the spring 26 expands, it exerts less force and it is in order to compensate for this weakening of the spring that the baffle plate 18 and its communicating tube 25 are arranged in the manner described above. When fluid flows through the outlet downwardly past the lower end of the tube 25, the resulting eductor action reduces the pressure in the space between the diaphragm and the plate 18, and by proper selection of the size and position of the tube 25, the decreased force of the spring is balanced by the decrease in the pressure below the diaphragm.

Although the variation of spring pressure inherent in the regulator may be compensated in the manner described, a further difficulty is encountered particularly when the fluid supply pressure varies. This difficulty results from the change in the effective pressure on the valve. It is readily apparent that the pressure differential between the areas of the valve subject to inlet and outlet pressures will change with changes in the supply pressure. In order to compensate for this pressure change, a second diaphragm is provided which exerts a force on the valve stem 11 which is equal and opposite to the resultant force due to the pressures exerted on the valve.

As shown in Fig. 1, the lower end of the plug 13 is formed to provide a recess or chamber and a cap 31 is threaded into the recess and seals the periphery of a diaphragm 32 between the cap and the plug. The diaphragm 32 is secured and sealed to the stem 11 by a washer 33 and nut 34. Thus, the diaphragm 32 divides the recess into an upper chamber 35 and a lower chamber 36 (and may be employed as an expansible chamber device to exert force on the stem 11). As shown in Fig. 2, the guide 12 is of hexagonal cross section so that there are six passages extending between it and the stem 11; these passages connect the chamber 35 in communication with the inlet 2 so that this chamber is at inlet pressure. The chamber 36 is maintained at outlet pressure by communication through an axial duct 37 in the stem 11. The duct 37 opens into the bottom of the cup of the fitting 22 and opens into the inlet through a slot 38 in the lower end of the push rod 21 and the clearance between the rod and the walls of the cup. The slot 38 in the lower end of the rod is clearly shown in Fig. 3.

The effective areas of the diaphragm 32 which are subject to inlet and outlet pressure are made respectively equal to the corresponding effective areas of the valve 9. The pressure exerted on the stem 11 by the resultant pressures on the valve and on the diaphragm 32 are equal and opposite and the pressures in the inlet and outlet may vary widely without disturbing the proper operation of the regulator. This construction renders the regulator effective to control the outlet pressure independently of changes in inlet pressure, the operation of the valve being dependent only upon the forces of the springs 14 and 26 and the pressure on the diaphragm 16.

It is desirable when the valve is opened, that the fluid flow rapidly through the port to the outlet and prevent substantial reduction in the required pressure. In order to facilitate the rapid flow of fluid, the regulator is constructed to increase the opening of the valve whenever fluid flows. It will be noted that the fitting 22 is shaped to slope from the valve toward the rod 21 and thus provides a Venturi effect at the upper edge of recess 38 adjacent to rod 21. This arrangement reduces the pressure at the open end of the duct 37 and also reduces the pressure in the chamber 36, thereby permitting further opening of the valve. This action is, of course, further increased by the Venturi action of the fluid flow past the opening of tube 25. This increases the speed of action of the regulator in supplying the fluid necessary to maintain the required pressure.

While I have illustrated and described a specific fluid pressure regulator embodying my invention, other applications will occur to those skilled in the art. I do not, therefore, desire my invention to be limited to the particular construction illustrated and I intend by the appended claims to cover all modifications which fall within the spirit and scope of my invention.

What I claim and desire to secure by Letters Patent is:

1. A fluid pressure regulating valve comprising a hollow body divided by a wall into inlet and outlet chambers, said wall having formed therein a valve port, a valve for the port, a round stem on the valve having an axial bore and a counter bore at its upper end, a plug removably secured in the body below the port having a polygonal bore for the valve stem and a lower external counter bore, a diaphragm sealed to the end of the stem within the counter bore defining a chamber, a second plug removably securing the diaphragm in the second bore and defining therewith a second chamber communicating with the axial bore in the valve stem, a fitting in the counter bore of the valve stem having a tapering external surface and a central bore, said fitting being disposed within the valve port for reducing the pressure on said diaphragm by a Venturi action of fluid flowing through the port when said valve is open, a push rod fitting loosely at one end into said fitting, a second diaphragm against the opposite end of the push rod and extending across an opening in said body, a bonnet on the body extending across the opening and diaphragm, and resilient means in the bonnet for urging the diaphragm downwardly against pressure in the outlet chamber.

2. A fluid pressure regulating valve comprising a hollow body divided by a wall into inlet and outlet chambers, said wall having formed therein a valve port, a valve for the port, a round stem on the valve having an axial bore and a counter bore at its upper end, a plug removably secured in the body below the port having a polygonal bore for the valve stem and a lower external counter bore, a diaphragm sealed to the end of the stem within the counter bore defining a chamber, a second plug removably securing the diaphragm in the second bore and defining therewith a second chamber communicating with the axial bore in the valve stem, a fitting in the counter bore of the valve stem having a tapering external surface and a central bore, said fitting being disposed within the valve port for reducing the pressure on said diaphragm by a Venturi action of fluid flowing through the port when said valve is open, a push rod fitting loosely at one end into said fitting, a second diaphragm against the opposite end of the push rod and extending across an opening in said body, a bonnet on the body extending across the opening and diaphragm, a member extending across said opening for sealing the diaphragm from the outlet chamber, a tube through said member, one end of the tube communicating with the outlet chamber and being disposed in a downstream direction with respect of fluid flow through the valve, and resilient means within the bonnet for urging the diaphragm downwardly.

3. A fluid pressure regulating valve comprising a hollow body divided by a wall into inlet and outlet chambers, said wall having formed therein a valve port, a valve for the port, a round stem on the valve having an axial bore and a counter bore at its upper end, a plug removably secured in the body below the port having a polygonal bore for the valve stem and a lower external counter bore, a diaphragm sealed to the end of the stem within the counter bore defining a chamber, a second plug removably securing the diaphragm in the second bore and defining therewith a second chamber communicating with the axial bore in the valve stem, a fitting in the counter bore of the valve stem having a tapering external surface and a central bore, said fitting being disposed within the valve port for reducing the pressure on said diaphragm by a Venturi action of fluid flowing through the port when said valve is open, and a push rod fitting loosely at one end into said fitting, a second diaphragm against the opposite end of the push rod and extending across an opening in said body, a bonnet on the body extending across the opening and diaphragm, a rigid member extending across the opening between the diaphragm and the outlet chamber and having a central opening for said push rod, a gland around the push rod for sealing the central opening, a tube extending through said member, one end of the tube communicating with the outlet and being disposed in a downstream direction, and resilient means in the bonnet for urging the diaphragm diwnwardly in a direction tending to open said valve.

4. A fluid pressure regulating valve comprising a hollow body divided by a wall into inlet and outlet chambers, said wall having formed therein a valve port, a valve for the port, a round stem on the valve having an axial bore and a counter bore at its upper end, a plug removably secured in the body below the port having a polygonal bore for the valve stem and a lower external counter bore, a diaphragm sealed to the end of the stem within the counter bore defining a chamber, a second plug removably securing the diaphragm in the second bore and defining therewith a second chamber communicating with the axial bore in the valve stem, a fitting in the counter bore of the valve stem having a tapering external surface and a central bore, said fitting being disposed within the valve port for reducing the pressure on said diaphragm by a Venturi action of fluid flowing through the port when said valve is open, and a push rod fitting loosely at one end into said fitting, a second diaphragm against the opposite end of the push rod and extending across an opening in said body, a bonnet on the body extending across the opening and diaphragm, a rigid member extending across the opening between the diaphragm and the outlet chamber and having a central opening for said push rod, a gland around the push rod for sealing the central opening, a tube extending through said member, one end of the tube communicating with the outlet and being disposed in a downstream direction, an adjusting screw threaded in the bonnet, a first spring interposed between the adjusting screw and the diaphragm, and a second spring around the first spring, the second spring being shorter than the first spring.

5. A fluid pressure regulating valve comprising a hollow body, an internal wall dividing the body into inlet and outlet chambers, said wall defining a valve seat having an elongated outlet passage communicating with the outlet chamber, a valve for opening and closing the valve seat including a stem having an axial bore, a first flexible diaphragm on the stem sealed to the body defining a first chamber communicating with the inlet chamber and a second chamber communicating only with the outlet passage through the axial bore, said stem and valve being movable responsive to inlet pressure in the first chamber to open position, a member on the valve communicating with the axial bore and extending into the outlet passage, the outer walls of said member defining with the walls of the outlet passage a venturi for creating a reduced pressure zone in the second chamber as liquid flows past the valve seat, a push rod for forcing the valve to open position extending through the outlet passage, a second flexible diaphragm and a second member sealed to each other defining a control chamber, said rod being reciprocally sealed through said second member and secured to said second diaphragm, a spring engaging the second diaphragm for forcing the rod and valve towards open position, and a tube connecting the control chamber with the outlet chamber, the mouth of said tube in the outlet chamber being disposed in the downstream direction, whereby flow of fluid past the valve seat tends to force the valve into open position by Venturi action at two points downstream from the valve seat.

CARL A. NORGREN.

REFERENCES CITED

The following references are of record in the file of this patent:

UNITED STATES PATENTS

| Number | Name | Date |
| --- | --- | --- |
| 331,544 | Reinecke | Dec. 1, 1885 |
| 880,402 | Reynolds | Feb. 25, 1908 |
| 1,515,911 | Terry | Nov. 18, 1924 |
| 1,525,426 | Mueller | Feb. 3, 1925 |
| 1,585,885 | Anderson | May 25, 1926 |
| 1,922,954 | Hughes | Aug. 15, 1933 |
| 1,931,777 | Thrall | Oct. 24, 1933 |
| 1,950,121 | McKee | Mar. 6, 1934 |
| 2,043,453 | Vickers | June 9, 1936 |